US006291906B1

(12) United States Patent
Marcus et al.

(10) Patent No.: US 6,291,906 B1
(45) Date of Patent: Sep. 18, 2001

(54) INFORMATION DISPLAY FOR VEHICLES

(75) Inventors: Konrad H. Marcus, Hilton Head Island, SC (US); Niall R. Lynam, Holland, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 09/660,712

(22) Filed: Sep. 13, 2000

Related U.S. Application Data

(63) Continuation of application No. 09/213,075, filed on Dec. 16, 1998, now Pat. No. 6,124,647.

(51) Int. Cl.[7] .................................................. B60R 1/12
(52) U.S. Cl. .......................... 307/10.1; 180/169; 342/70; 359/603; 359/838; 359/839
(58) Field of Search ............................. 307/10.1; 342/70; 359/839, 838, 603, 609, 267; 180/169; 340/903, 436; 367/909; 701/301

(56) References Cited

U.S. PATENT DOCUMENTS

| | | | |
|---|---|---|---|
| D. 391,214 | 2/1998 | Hook et al. ......................... | D12/187 |
| 4,630,904 | 12/1986 | Pastore ................................ | 362/494 |
| 5,037,182 | 8/1991 | Groves et al. ...................... | 359/630 |
| 5,416,313 | 5/1995 | Larson et al. ...................... | 250/214 |
| 5,486,832 | * 1/1996 | Hulderman ........................... | 342/70 |
| 5,530,240 | * 6/1996 | Larson et al. ...................... | 359/839 |
| 5,587,699 | 12/1996 | Faloon et al. ...................... | 362/30 |
| 5,621,514 | * 4/1997 | Paranto et al. ..................... | 180/169 |
| 5,786,772 | 7/1998 | Schofield et al. .................. | 340/903 |
| 5,798,575 | 8/1998 | O'Farrell et al. .................. | 307/10.1 |
| 5,867,133 | 2/1999 | Toffolo et al. ..................... | 345/7 |
| 6,089,721 | * 7/2000 | Schierbeek ......................... | 359/603 |

FOREIGN PATENT DOCUMENTS 9734780    9/1997 (WO).

OTHER PUBLICATIONS

SAE Technical Paper Series 96C011—A comparison of Two Product Development Approaches: Seamless Electro–Mechanical Design and Mnemonic Design with Representative Products (Mirror/Display and Rearward Display Accessible by Rearview Mirror), by Betty Lou McClanahan et al. (Convergence 96 International Congress on Transportation Electronics, Dearborn, Michigan, Oct. 21–23, 1996).

SAE Technical Paper Series 98C063—Information Bias in the Passenger Vehicle: Correcting to Aid the Vehicle Control Task, by Betty Lou McClanahan, MIT; (Convergence 98 International Congress on Transportation Electronics, Dearborn, Michigan, Oct. 19–21, 1998).

Rear Speed Display: A Mnemonic Device to Improve Driver Situational Awareness, by Betty Lou McClanahan, MIT Racing Team; Stephen J. Buckley, Chrysler Corporation; and Jason Holehouse and R.B. Stiewing, Skip Barber Racing School; Proceedings, ISATA 97, Jun. 1997; 7SAF039.

* cited by examiner

Primary Examiner—Albert W. Paladini
(74) Attorney, Agent, or Firm—VanDyke, Gardner, Linn & Burkhart, LLP

(57) ABSTRACT

An information display system for a vehicle includes a reverse image display and a rearview mirror. The reverse image display is positioned rearwardly of a driver of the vehicle such that an image of the message being displayed is reflected from the rearview mirror and received in reverse order and thus readable by the driver. A control may be included which activates the reverse image display in response to an input and may vary the intensity, color and/or frequency of repeat of the display in response to other inputs. The control may convey multiple messages through a single reverse image display or through multiple displays.

14 Claims, 5 Drawing Sheets

INFORMATION DISPLAY FOR VEHICLES

CROSS-REFERENCE TO RELATED APPLICATION

This is a continuation of application Ser. No. 09/213,075, filed Dec. 16, 1998, now U.S. Pat. No. 6,124,647 by Konrad H. Marcus and Niall R. Lynam, entitled INFORMATION DISPLAY IN A REARVIEW MIRROR, the disclosure of which is hereby incorporated by reference herein.

BACKGROUND OF THE INVENTION

As a vehicle is being driven, there is certain information that the driver may require or desire to see while driving. The advancement of technology and consumer demands have resulted in more information being readily displayed on the instrument panel of the vehicle, which has further resulted in the instrument panel area of the vehicle interior cabin becoming cluttered with a variety of information displays. Therefore, the driver of the vehicle may confuse one display with another or may fail to notice a particular display because of this clutter and the limited time the driver has to glance at the displays. The time in which it takes for the driver to look downward to read one or more alphanumerical displays is critical since this corresponds to time that the driver is not looking forward toward where the vehicle is being driven. Concerns such as these are particularly critical for alpha numerical displays, such as digital speedometer displays, compass displays, and the like, where numbers and/or text are displayed to the driver, and which require a longer period of time for the driver to recognize and comprehend the display than glancing at a simple symbol or the like.

An interior rearview mirror is another appropriate location for placing information displays, since looking at the interior rearview mirror is an important part of driving a vehicle. Samples of rearview mirrors incorporating information displays are disclosed in commonly assigned U.S. Pat. No. 5,416,313, issued to Larson et al., which describes a compass display incorporated into a mirror reflector, and which is hereby incorporated herein by reference. However, incorporation of a display within the mirror reflector of the rearview mirror requires that the mirror reflective area be reduced to provide room for the display, thereby decreasing the field of vision of the driver rearwardly of the vehicle. Consequently, other displays have been placed on the mirror case chin or eyebrow, so as to avoid reducing the size of the mirror reflective surface. An example is shown in commonly assigned U.S. Pat. No. Des. 391, 214, issued to Hook et al., which shows a display positioned adjacent the lower edge of the interior mirror case, and which is hereby incorporated by reference herein. However, the use of such displays may substantially increase the size of the mirror case itself, thereby potentially restricting the driver's forward field of view.

Another concern with displays being positioned on the instrument panel or on or around the rearview mirror is that it is difficult for a driver's eyes to adjust quickly to focus on the displays, as they are in close proximity to the driver relative to the forward viewing through the windshield. When these displays are positioned in close proximity to the driver, the driver's eyes have to adjust from a long focal length, when looking forward in the direction of travel or rearward via the rear view mirror, to a short focal length as the driver looks at the instrument panel or the rear view mirror or mirror housing. This not only requires additional time for the eyes to adjust, but also may become annoying to the driver as this process may be repeated multiple times during even a short trip.

In an effort to remove certain displays from the instrument panel and further make them easier for the driver of the vehicle to see and recognize them, heads up displays and other forward projecting displays have been implemented to project a virtual image display that the driver may easily glance at to read the information being communicated thereby. However, while providing the driver with the information in an optically beneficial manner, these displays may interfere with the forward field of view of the driver as the vehicle is driven down the road and are also much more costly to manufacture and implement than conventional displays positioned within the vehicle cabin area.

Therefore, there is a need in the art to provide a display in a manner that maximizes both forward and rearward fields of view, and that is economical and commercially attractive to implement. The display must be positioned in an area where a driver may quickly and easily glance at the display to read the information being communicated thereby.

SUMMARY OF THE INVENTION

The present invention is intended to provide a display system for a vehicle that maximizes both the forward and rearward fields of view, while being viewable in an area forward of the driver so as to be easily viewed by the driver while driving the vehicle.

According to a first aspect to the invention, a display system for a vehicle comprises a display, which is located on the vehicle rearward of the driver and is a reverse image display of the signal or information to be received by the driver. A rearview mirror is included such that the display is viewable as a mirror image in reverse order by the vehicle driver in the rearview mirror.

According to another aspect of the invention, the display may be positioned around the perimeter of a rear window of the vehicle, so as not to interfere with the rearward field of view of the driver, while still being easily viewed and readable via the rearview mirror.

According to still yet another aspect of the invention, a control may be included which actuates the display in response to an electronic input. The control may also vary the intensity, color and/or frequency of the display, and/or an auxiliary light or display, depending on the input received by the control.

These and other objects, advantages, purposes and features of this invention will become apparent upon review of the following specification in conjunction with the drawings.

DESCRIPTION OF THE PREFERRED EMBODIMENT

Figure 1:
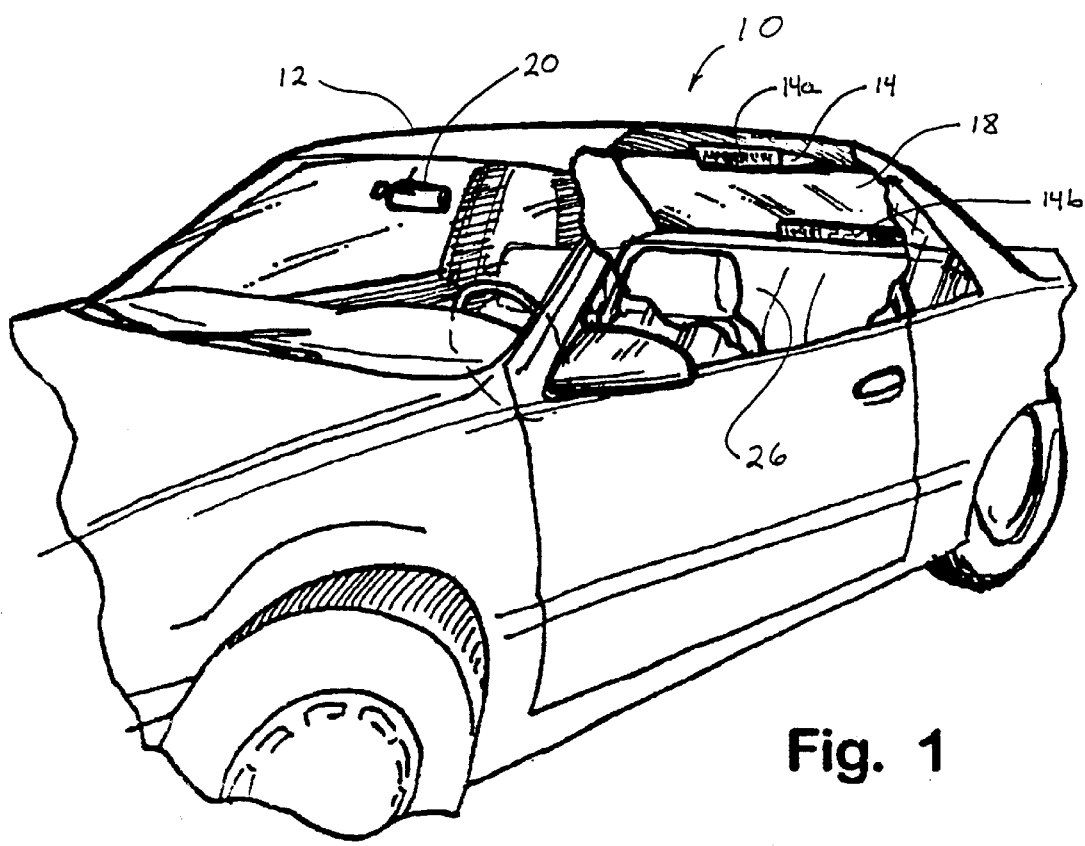
FIG. 1 is a perspective view with portions broken away of a vehicle incorporating the present invention.

Referring now specifically to the drawings and the illustrative embodiments depicted therein, a vehicle display system 10 is positioned at least partially within a vehicle 12 and provides the driver of the vehicle with informational messages. Display system 10 includes a reverse image display 14, preferably positioned within the vehicle in the vicinity of a rear window 18 of the vehicle, and an interior rear view mirror 20 positioned forwardly of the driver such as on the interior windshield surface. Rear view mirror 20 has a reflective element 22, such as a glass or plastic prism, coated on its second surface with a reflective coating in a conventionally known fashion. Alternately, rearview mirror element 22 can be a planar or a prismatic element, or an electro-optic element such as an electrochromic mirror assembly incorporating an electrochromic medium whose light reflectivity varies with the electrical voltage applied thereto. Mirror element 22 receives an image of the reverse image display 14 and reflects a reversed mirror image 24 of the display toward the driver. Mirror 20 reverses the reverse image display 14 so that the display information may be read and understood by the driver. A control circuit 40 (FIG. 8) may also be included in the display system which activates the reverse image display 14 in response to an electronic input. By presenting a display to the driver of the vehicle as a reflection in the rear view mirror 20, the display system of the present invention does not require a portion of the reflective surface of the rear view mirror 20 to be removed, thereby resulting in minimal or substantially no reduction of the rearward field of view of the driver. Furthermore, the forward field of view of the driver is likewise not interfered with, in that the message is displayed on the rear view mirror reflective surface, and does not require mirror case chin or eyebrow display surfaces which may restrict the driver's forward field of view.

Figure 3:
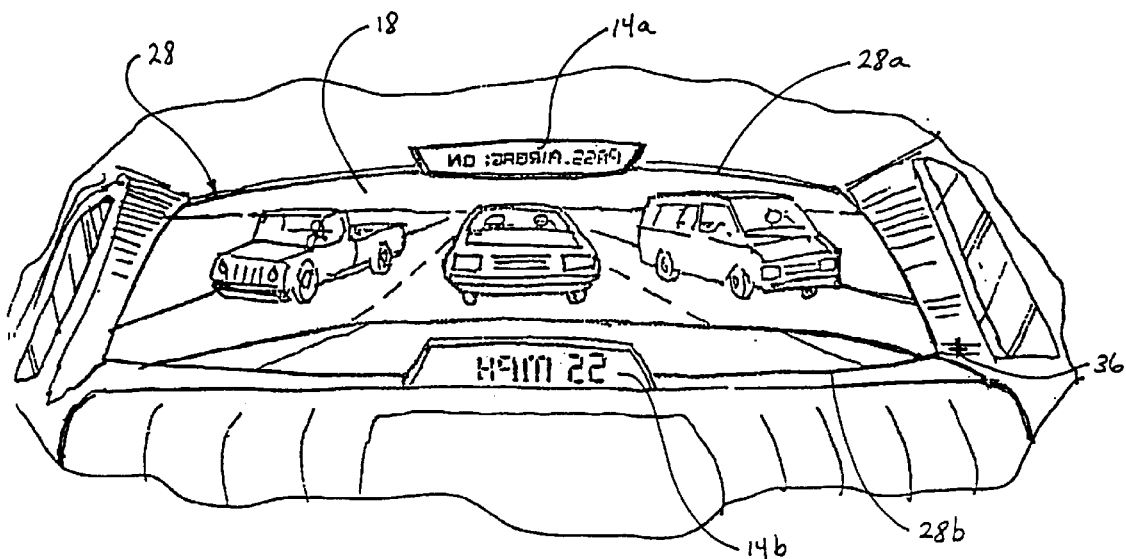
FIG. 3 is a perspective view taken rearwardly from within the vehicle of the information displays adjacent the rear window of the vehicle.
Figure 4:
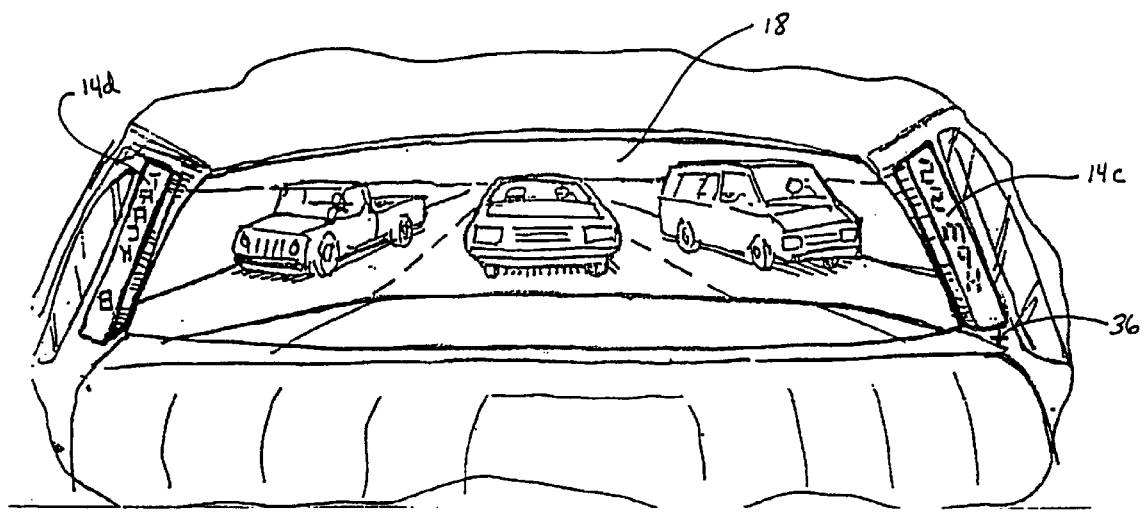
FIG. 4 is a view similar to FIG. 3, showing alternate locations for the information displays of the present invention.
Figure 5:
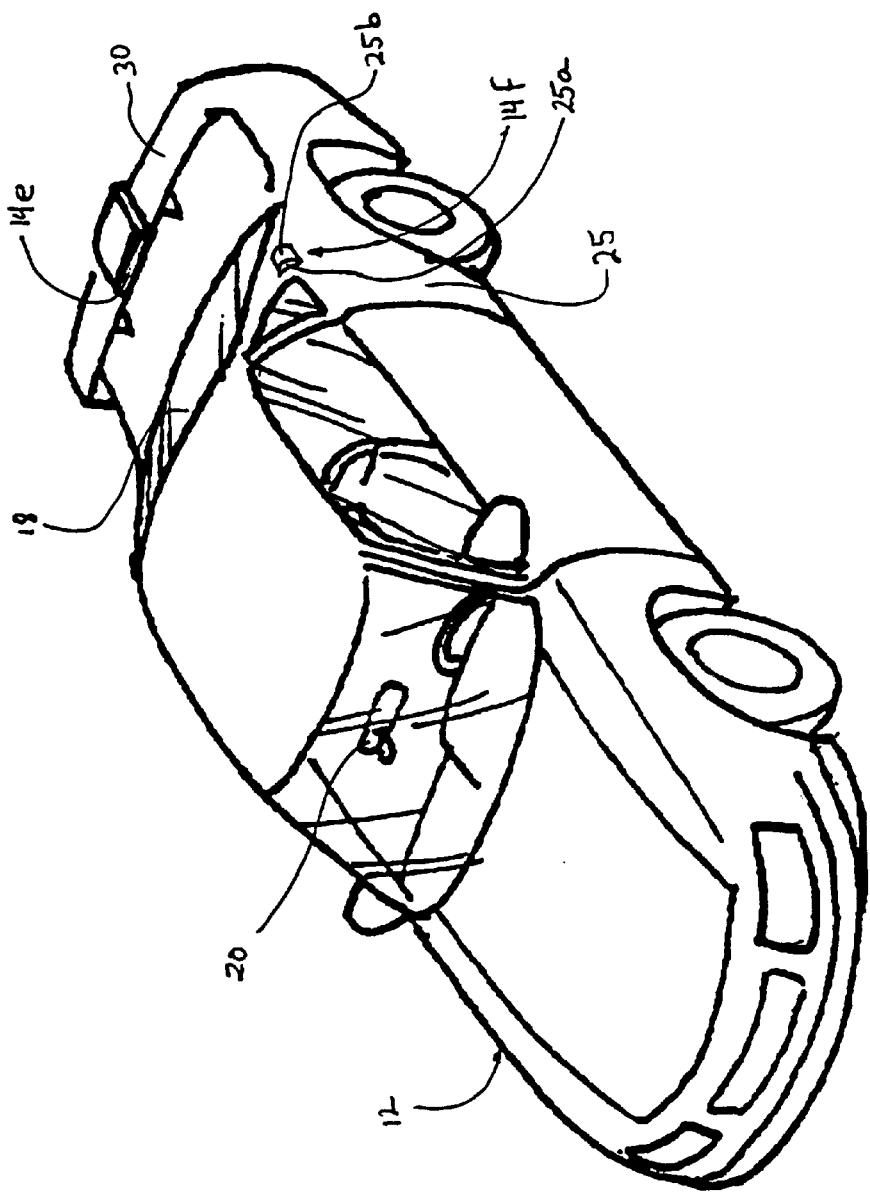
FIG. 5 is a perspective view of a vehicle with an information display exteriorly mounted on the rear deck of the vehicle.

The reverse image display 14 of the present invention is located rearward of the driver and the information displayed is viewable and interpretable by the driver by looking forward toward the windshield and viewing the reflected image of the rear cabin mounted display in the interior rear view mirror. Conceivably, however, the display may be positioned so as to be viewable in an exterior mirror of the vehicle, such as a side mirror, with a reverse image display 14f being positioned rearward of the driver location such as on a side body panel 25 or side body element (FIG. 5). The reverse image display 14f may be positioned on a forward face 25a of a housing 25b extending outwardly from the side body panel 25 of the vehicle 12. Preferably, however, the reverse image display 14 is positioned within the passenger compartment 26 of the vehicle, either as a trim item around the rear window 18 or otherwise positioned adjacent a peripheral edge 28 of the rear window. The display 14 may be positioned generally horizontally on a forward face of a center high mounted stop light (CHMSL) or on a trim structure attached to the upper cabin area substantially adjacent an upper edge 28a of the rear window. Most preferably, the display is placed at 14a at the center upper portion of the rear window or back light 18, so that it is less likely to be blocked or occluded by the heads of rear seat passengers within the vehicle. However, the display may be positioned in other areas around the perimeter of the rear window 18 such as at 14b at the center, lower perimeter 28b of rear window 18 (FIG. 3), or at 14c or 14d in vertically oriented positions on the left or right side of rear window 18 in the rear window pillars (FIG. 4). Alternately, the display may even be positioned outside of the vehicle, such as at 14e on an upper surface of a trunk, rear deck, or spoiler 30 or the like (FIG. 5). By positioning the display in these areas, the display does not interfere with the rearward field of view of the driver through the rear view mirror, as the display is positioned in an area where other portions of the vehicle are already generally framing the driver's rearward field of view.

The reverse image display 14 preferably conveys informational messages to the driver of the vehicle. Preferably, the information provided by the display will be in reverse alphanumeric form, and will communicate vehicle status information and the like. For example, the display may be a digital speedometer display, compass direction display, interior and/or exterior temperature display, pager display, radio station display, CD player track display, tire pressure display, global positioning system (GPS) display, toll booth payment display, message center display, cellular phone number display, passenger air bag status display and the like.

The reverse image display 14 of the present invention is preferably an emitting display such as a vacuum fluorescent display or a light emitting diode (LED) display, although other display types such as an electroluminescent display, a liquid crystal display (LCD) or an electrochromic display may be used. Alternatively, the display may be a back lit display, with a light-emitting source occasionally directing illumination through a pattern formed in the display. In order to obtain an appropriate image size, so that the driver of the vehicle may correctly and readily read the information displayed, the desired character size of the reverse image display is preferably at least 5 mm. More preferably, the characters have a size of at least 7 mm, and most preferably of at least 10 mm. By providing characters of these preferred sizes, the reflected image of the reverse image display 14 in the rearview mirror 20 is of a size that may be easily read by the driver of the vehicle, but without excessive interference with the viewing area rearward of the vehicle. The display may be a multi-pixel display, a dot-matrix display, an active matrix display and/or may be a scrolling display.

Figure 8:
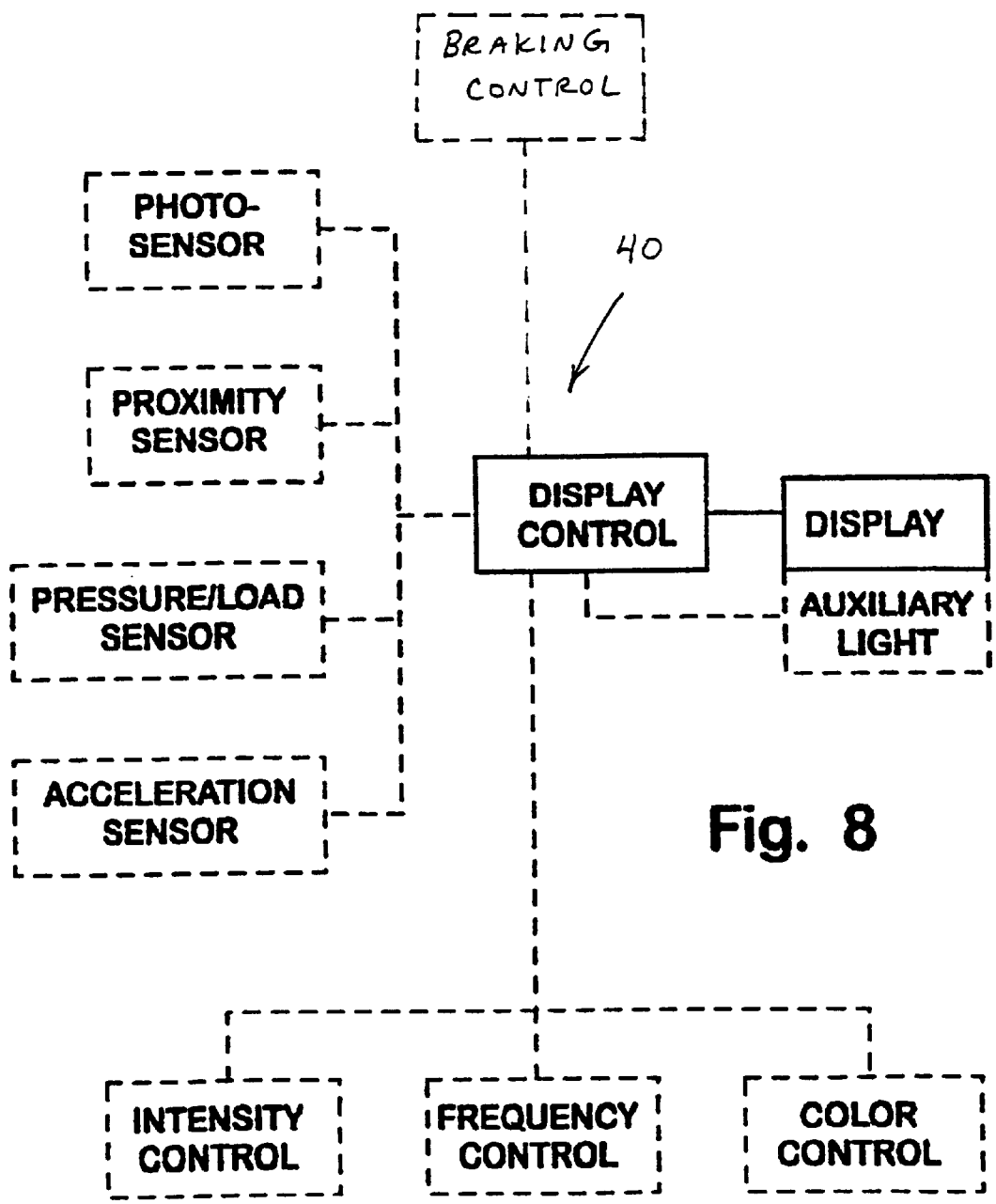
FIG. 8 is a block diagram of the control function of the present invention.

As shown in FIG. 8, the control 40 of the present invention activates the reverse image display 14 in response to an electronic input from one or more sources, and may further activate one or more displays or auxiliary lights if so desired. The input may be from a digital speedometer, compass, temperature gauge, pager, radio, CD player, tire pressure gauge [such as by pressure sensors located at the wheel tires that communicate by radio frequency to the image display device located within the vehicle interior cabin], message center, passenger air bag controls, cellular phone controls, global positioning system (GPS) and the like. The display system may be set to display the status of a single component, or may be set to alternatingly display the status of one or more of the components, and display other messages depending on the input signal to the control. The control of the present invention thus may activate one or more reverse image displays based on one or more signals received by the control, and may further activate one or more auxiliary lights or other displays elsewhere within the vehicle.

In addition to varying the messages displayed on the reverse image display 14, the control 40 of the present invention may further vary the intensity, color or frequency of the message being displayed on the reverse image display 14. For example, the intensity of the display may vary dependent on the ambient lighting conditions, such as whether it is day or night. Preferably, a light sensor may be used to communicate with the control such that during high ambient light conditions, the display intensity is maximized, whereas under low ambient light conditions, such as nighttime, the intensity of the display may be decreased. Preferably, the intensity of the display 14 may be minimized as ambient light conditions fall below approximately 100 lux. Alternatively, the intensity may be linked to the dimming of other displays on the instrument panel. If the rear view mirror reflector is an automatic electrochromic (EC) mirror element, then the intensity of the display preferably increases during times when the reflectivity of the EC mirror element decreases. Thus, the intensity of the display, as read in the EC mirror, is preserved even though the reflection off the EC mirror reflector has decreased due to the anti-glare dimming of the EC mirror. The light sensor or photo-sensor, which detects the amount of ambient light present and communicates this information to the control which thereby controls the display intensity, may be located adjacent to the display element or distal from the display element, such as part of an automatic EC Tear view mirror circuit or vehicle head lamp activation circuit. Also, when the interior rearview mirror is of the prismatic type that can be manually or automatically flipped from a normal reflecting mode (typically of reflectance greater than about 80%) to an antiglare mode (typically of reflectance about 4%), the intensity of reverse image display 14 can be increased (such as by a ten or greater fold increase in intensity) so that readability of the display information as seen by the driver in reflection off the interior mirror when in its flipped to its antiglare mode is preserved.

Although the intensity variation is described relative to the ambient light present around the vehicle, other signals may trigger the control to vary the light, color or frequency of reverse image display 14. The signals may come from a rearward facing camera (such as an active pixel image array CMOS camera or a CCD camera), sonar, radar (including Doppler radar), infrared beam/detector device or similar rear proximity approaching sensor devices, such that the light, color, or frequency of the display message is dependent upon the proximity of a vehicle or other object rearward of the vehicle. For example, if another vehicle is approaching the rear of the driver's vehicle, or is otherwise at an unsafe distance from the rear of the vehicle, the proximity sensor may signal the control to activate a display warning the driver against sudden braking or the like. The display may further increase in intensity, change to a different color, or flash at a more frequent rate as the distance detected between the driver's vehicle and the other object lessens. By changing the appearance of the display as the condition that is being communicated worsens, the present invention substantially reduces the possibility that the driver will be unaware of the problem. The control may also activate an auxiliary light or display elsewhere in the vehicle to further warn the driver of a particular condition that is detected. The proximity detector system may even be linked to vehicle braking to modulate the degree of braking of the vehicle based on the proximity and rate of approach of a rear-approaching vehicle. Thus, tailgating accidents may be substantially reduced or obviated.

Reverse image display 14 may also be linked to an active cruise control system and/or collision avoidance system of the vehicle that uses a forward facing sensor (such as a CCD or a CMOS camera, a sonar system, an ultrasound system, or a radar system such as a Doppler radar system or the like) to detect the presence of, distance to, and/or rate of approach to another vehicle or object in front of, and being approached by, the vehicle equipped with reverse image display 14. Reverse image display 14 can display a warning message to the driver and/or can display the closing distance or the rate of close to the forward vehicle or object as an alphanumeric display. Likewise, where a back-up aid is provided on the vehicle that detects how close the vehicle is to an object that the vehicle is backing up to (such as provided by ultrasonic sensors and/or camera-vision systems which are typically mounted in the trunk area of the vehicle), the distance to the rearwardly located object may be displayed alphanumerically to the driver by reverse image display 14. The driver can view the reflected image of reverse image display 14 in the rearview mirror, and thus the driver can conveniently reverse into a parking space or the like without needing to turn around to look rearward. As a further option, a personal pager that the driver or any other vehicle occupant carries about them to receive pager information may be plugged into a slot or receptacle provided within the interior cabin so that any pager information received is communicated to the driver via the driver viewing in the rearview mirror reflector the image of that pager information, as displayed by reverse image display 14. Optionally and preferably, such a pager-receiving receptacle could be provided on, at or within the interior rearview mirror assembly itself. Also, reverse image display 14 may generate information produced by forward facing and/or rearward facing night vision systems such as are known in the night vision art. Also, information from blind-spot detectors, such as is described in U.S. Pat. No. 5,786,772, entitled VEHICLE BLIND SPOT DETECTION DISPLAY SYSTEM, assigned to the same assignee as the present application, the disclosure of which is hereby incorporated by reference herein, may be displayed by reverse image display 14 for viewing by the driver in the interior rearview mirror and/or exterior side view mirrors.

Figure 6:
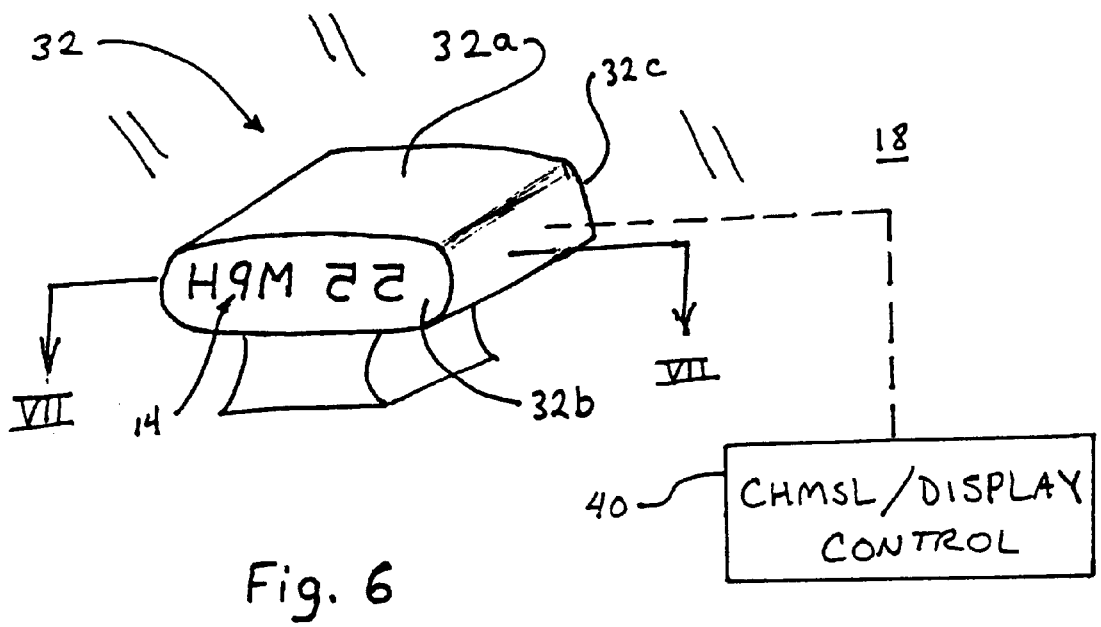
FIG. 6 is a perspective view of a CHMSL housing incorporating an embodiment of the present invention.
Figure 7:
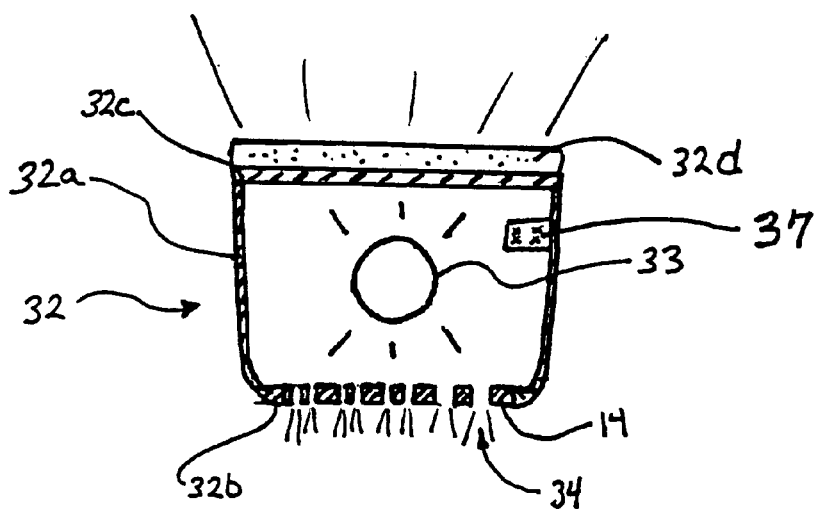
FIG. 7 is a cross-sectional view of the CHMSL housing of FIG. 6 taken along line VII—VII in FIG. 6.

Preferably, the display 14 element of the present invention is mounted within a forward facing surface of the center high mounted stoplight (CHMSL) 32, so as to avoid limiting the driver's rearward field of view (FIG. 6). The CHMSL includes an illumination source 33, which may be an incandescent light or more preferably a light emitting diode (LED) or light emitting phosphormatic. A typical CHMSL housing 32a is shown in FIGS. 6 and 7, and includes a reverse image display 14 on its forward face 32b. A rearward face 32c of the CHMSL housing 32a is typically positioned substantially adjacent the rear window 18. As shown in FIG. 7, the illumination source 33 is located within the CHMSL housing 32a to provide illumination rearward through a semi-transparent, and typically red colored, cover 32d, to signal drivers of other vehicles rearward of the vehicle 12 that the brakes of vehicle 12 have been applied. If the reverse image display 14 is a back lit display, illumination from the illumination source 33 of CHMSL 32 also projects forwardly, through a plurality of openings or slots 34 which combine to form the alphanumeric display. The slots 34 may be covered by a colored, semi-transparent cover to project the display to the driver in a preferred color. The driver of the vehicle 12 then may detect and easily read the display as the light projecting therethrough is reflected toward the driver by the interior rear view mirror 20. The CHMSL may be a separate housing as shown, or may alternatively be included as a trim item at the upper or lower edges of the rear window.

A CHMSL control, such as control 40 described above, may also vary the light in the CHMSL depending on the braking rate of the vehicle or, similarly, depending on the severity or intensity of braking by the driver of the vehicle. The CHMSL control may vary either the light intensity, the color of the light, the rate of repeat of the light as it may flash on and off, or further cause an auxiliary light to be activated in a manner similar to the control 40 for the display, as discussed above. The severity or intensity of braking may be determined by a pressure or load sensor on a brake pedal, or by an acceleration or deceleration sensor capable of measuring G forces on the vehicle, or by a rear facing camera, sonar, radar (such as Doppler radar), infrared beam/detector device, or similar rear proximity approaching sensor device. A rear proximity sensor device or the like may be used to trigger the CHMSL light and variations thereof independent of braking of the vehicle by the driver. This allows the CHMSL to automatically warn a driver of another vehicle that he or she is unreasonably close to the vehicle incorporating the present invention. The reverse image display may be backlit by the stoplights within the CHMSL, such that the driver is aware that the CHMSL light has been activated and is thus further aware of the other vehicle or object being unreasonably close. Alternatively, the sensor device may further communicate with the control 40 of the reverse image display 14 so as to activate the display to communicate the proximity of the approaching vehicle or to otherwise warn the driver of the vehicle to be careful about sudden braking. Optionally, a digital readout of the proximity of an approaching or nearby vehicle may be displayed. Also, a back up distance to an object rearward of the vehicle may be displayed to communicate to the driver the proximity of objects as the vehicle is driven in reverse.

Preferably, CHMSL control 40 includes a piezoelectric type accelerometer sensor, most preferably packed in an integrated circuit type package or chip. More preferably, the G-force sensor and its associated circuitry are provided as a unitary CHMSL control module 37 (FIG. 7) that is located at, within or on the CHMSL assembly that is located rearward of the driver at or close to the rear window. Most preferably, the CHMSL module 37 is located within the housing of the CHMSL assembly so that it is substantially protected thereby and substantially hidden from view. CHMSL module 37 can receive an ignition supply (typically 12 volts or thereabouts) from the vehicle ignition system. Location of the CHMSL control (preferably including a G-force sensor such as an accelerometer sensor) local to, adjacent to, at or within the CHMSL assembly has the advantage of substantially obviating the need for a wiring connection to the likes of the brake pedal at the front of the vehicle cabin as is the case where a pressure sensor or the like is linked to the brake pedal to sense braking force with its output fed back to the rear mounted CHMSL assembly via a wire connection (or digitally via a car area network (CAN) or multiplex system such as is disclosed in commonly assigned U.S. Pat. No. 5,798,575 issued to O'Farrell et al., or PCT International Application No. WO 97/34780, published Sep. 25, 1997 to Fletcher et al., the disclosures of which are hereby incorporated by reference herein).

Figure 2:
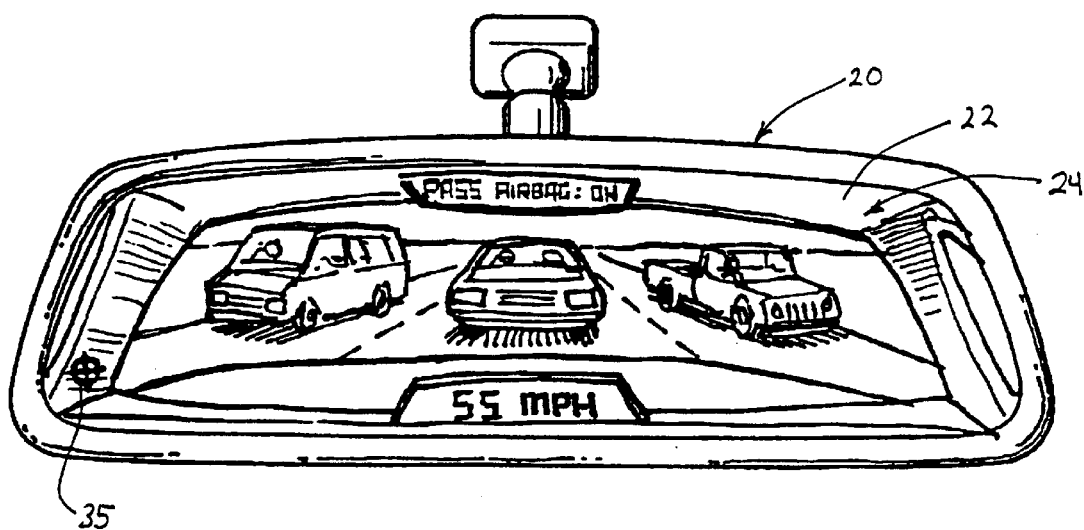
FIG. 2 is a front elevation of an interior rearview mirror as viewed by the vehicle driver and showing the view rearwardly of the driver of the vehicle visible in the reflective surface of the interior rearview mirror.

The display system 10 of the present invention may further include a sighting mark 35 (FIG. 2) to easily and properly align the mirror and display for the proper rearward field of view which includes the reverse image display. The driver may adjust the rear view mirror 20 so that a ring or mark 35 on the reflective surface 22 of mirror 20 is aligned with a corresponding ring or mark 36 (FIGS. 3 and 4) positioned either on the rear window or in the vicinity thereof. This allows for different drivers to operate the vehicle and easily set the rear view mirror to reflect an image not only of the scenic information rearward of the vehicle, but also of any and all reverse image displays 14, 14a, 14b, 14c, 14d or 14e in the vicinity of the rear window 18, as a new driver may not be initially aware of the mirror image displays. Furthermore, an automatic mirror memory system, where the mirror alignments preferred by the viewing driver are electronically stored, may be set to positions such that any and all of the displays are included in the image reflected toward the driver when the stored setting is recalled by that driver.

Therefore, an information display is provided in a rear view mirror which provides the driver of the vehicle with messages and other information regarding the status of the vehicle or the like. When driving the vehicle, the reflective element of an interior rearview mirror may be adjusted to view rearward through the rear window of the vehicle or simply rearwardly of the vehicle if the vehicle is a convertible with the top down. The image seen in the mirror includes the top, sides and/or bottom of the rear window assembly. By placing a display rearward of the driver, such as in the front of the CHMSL, the information displayed, because it is displayed in a reversed, mirror image form, can be read by the driver by looking at a reflection of the display in the rear view mirror. Therefore, by quickly looking in the rear view mirror, the driver can correctly and readily read the information display, and moreover, the image as seen in the mirror is a virtual image, thus giving the driver the optical benefits usually only deliverable by much more costly and complicated devices such as a heads up display. This avoids the concern of a driver's eyes having to quickly adjust from long distance focusing as the driver looks forward to short distance focusing as the driver looks down at the instrument panel or to a display on or around the reflective surface of the rear view mirror. The end result is a low cost display system which provides a driver with quick and easy viewing of the display, with minimal interference of either the forward or rearward field of view of the driver.

Optionally, a non-reverse image display may be located horizontally mounted such as in the package tray area that abuts the rear window at the rear of the vehicle cabin. The image from this display can be reflected off a mirror surface (such as a metalized glass substrate) forward from the rear of the cabin toward the interior rear view mirror as a reverse image reflection of the horizontally mounted non-reverse image display. This reverse image is viewed by the driver in reflection off the interior rear view mirror, and thus the driver sees a normal, non-reverse image of the display.

Changes and modifications in the specifically described embodiments can be carried out without departing from the principles of the invention, which is intended to be limited only by the scope of the appended claims, as interpreted according to the principles of patent law.

The embodiments of the invention in which an exclusive property right or privilege is claimed are defined as follows:

1. A collision avoidance system for use in a vehicle comprising:
   a detector mounted on the vehicle, said detector being operable to detect at least one of a presence of, a distance to, and a rate of approach to another vehicle or object in front of and being approached by the vehicle, wherein said detector comprises an imaging array sensor;
   a control, said control being operable to receive an input signal from said detector, said control being responsive to said input signal and producing an output signal indicative of said detector detecting said at least one of the presence of, distance to, and rate of approach to another vehicle or object in front of and being approached by the vehicle; and an information display, said output signal of said control activating said information display to communicate an alert to the driver of the vehicle of said at least one of the presence of, distance to, and rate of approach to another vehicle or object in front of and being approached by the vehicle, wherein said control is further operable to change the appearance of said information display as the condition being communicated worsens in order to warn the driver of a particular condition that is detected by said detector.

2. The collision avoidance system of claim 1, wherein said detector is also operable to detect at least one of a presence of, a distance to, and a rate of approach to another vehicle or object rearward of and approaching the vehicle.

3. The collision avoidance system of claim 1, wherein said information display comprises an alphanumeric display.

4. The collision avoidance system of claim 3, wherein said information display displays at least one of the rate of approach and the distance of the other vehicle or object to the vehicle.

5. The collision avoidance system of claim 1, wherein said control is operable to vary an intensity of said information display in response to a level of ambient light present at the vehicle.

6. A collision avoidance system for use in a vehicle comprising:

a detector mounted on the vehicle, said detector being operable to detect at least one of a presence of, a distance to, and a rate of approach of another vehicle or object to the rear of and approaching the vehicle, wherein said detector comprises an imaging array sensor;

a control, said control being operable to receive an input signal from said detector, said control being responsive to said input signal and producing an output signal indicative of said detector detecting said at least one of the presence of, distance to, and rate of approach of another vehicle or object to the rear of and approaching the vehicle; and an information display, said output signal of said control activating said information display to communicate an alert to the driver of the vehicle of said at least one of the presence of, distance to, and rate of approach of another vehicle or object to the rear of and approaching the vehicle, wherein said control is further operable to change the appearance of said information display as the condition being communicated worsens in order to warn the driver of a particular condition that is detected by said detector.

7. The collision avoidance system of claim 6, wherein said detector is also operable to detect at least one of a presence of, a distance to, and a rate of approach to another vehicle or object forward of the vehicle and being approached by the vehicle.

8. The collision avoidance system of claim 6, wherein said information display comprises an alphanumeric display.

9. The collision avoidance system of claim 8, wherein said information display displays at least one of the rate of approach and the distance of the other vehicle or object to the vehicle.

10. The collision avoidance system of claim 6, wherein said control is operable to vary an intensity of said information display in response to a level of ambient light present at the vehicle.

11. A collision avoidance system for use in a vehicle comprising:

a detector mounted on the vehicle, said detector being operable to detect at least one of a presence of, a distance to, and a rate of approach to another vehicle or object in front of and being approached by the vehicle;

a control, said control being operable to receive an input signal from said detector, said control being responsive to said input signal and producing an output signal indicative of said detector detecting said at least one of the presence of, distance to, and rate of approach to another vehicle or object in front of and being approached by the vehicle; and an information display, said output signal of said control activating said information display to communicate an alert to the driver of the vehicle of said at least one of the presence of, distance to, and rate of approach to another vehicle or object in front of and being approached by the vehicle, wherein said control is further operable to change the appearance of said information display as the condition being communicated worsens in order to warn the driver of a particular condition that is detected by said detector, wherein said information display comprises a reverse image display which includes a visible display and a rearview mirror, said visible display being positionable on the vehicle rearward of a driver of the vehicle, said visible display being a reverse image display of information to be received by the driver, said reverse image display being viewable by the driver as a readable mirror image in said rearview mirror.

12. A collision avoidance system for use in a vehicle comprising:

a detector mounted on the vehicle, said detector being operable to detect at least one of a presence of, a distance to, and a rate of approach of another vehicle or object to the rear of and approaching the vehicle;

a control, said control being operable to receive an input signal from said detector, said control being responsive to said input signal and producing an output signal indicative of said detector detecting said at least one of the presence of, distance to, and rate of approach of another vehicle or object to the rear of and approaching the vehicle; and an information display, said output signal of said control activating said information display to communicate an alert to the driver of the vehicle of said at least one of the presence of, distance to, and rate of approach of another vehicle or object to the rear of and approaching the vehicle, wherein said control is further operable to change the appearance of said information display as the condition being communicated worsens in order to warn the driver of a particular condition that is detected by said detector, wherein said information display comprises a reverse image display which includes a visible display and a rearview mirror, said visible display being positionable on the vehicle rearward of a driver of the vehicle, said visible display being a reverse image display of information to be received by the driver, said reverse image display being viewable by the driver as a readable mirror image in said rearview mirror.

13. A collision avoidance system for use in a vehicle comprising:

a detector mounted on the vehicle, said detector being operable to detect at least one of a presence of, a distance to, and a rate of approach of another vehicle or object to the rear of and approaching the vehicle;

a control, said control being operable to receive an input signal from said detector, said control being responsive to said input signal and producing an output signal indicative of said detector detecting said at least one of the presence of, distance to, and rate of approach of another vehicle or object to the rear of and approaching the vehicle, wherein said control is further operable to actuate an exterior light of the vehicle to signal to a driver of the other vehicle that the other vehicle is within a threshold distance to the vehicle or approaching the vehicle at a rate which is greater than a threshold rate of approach; and an information display, said output signal of said control activating said information display to communicate an alert to the driver of the vehicle of said at least one of the presence of, distance to, and rate of approach of another vehicle or object to the rear of and approaching the vehicle, wherein said control is further operable to change the appearance of said information display as the condition being communicated worsens in order to warn the driver of a particular condition that is detected by said detector.

14. A collision avoidance system for use in a vehicle comprising:

a detector mounted on the vehicle, said detector being operable to detect at least one of a presence of, a distance to, and a rate of approach of another vehicle or object to the rear of and approaching the vehicle;

a control, said control being operable to receive an input signal from said detector, said control being responsive to said input signal and producing an output signal indicative of said detector detecting said at least one of the presence of, distance to, and rate of approach of another vehicle or object to the rear of and approaching the vehicle, wherein said control is further operable to modulate a braking system of the vehicle in response to a particular condition being detected by said detector; and an information display, said output signal of said control activating said information display to communicate an alert to the driver of the vehicle of said at least one of the presence of, distance to, and rate of approach of another vehicle or object to the rear of and approaching the vehicle, wherein said control is further operable to change the appearance of said information display as the condition being communicated worsens in order to warn the driver of a particular condition that is detected by said detector.

* * * * *